Figure 11:
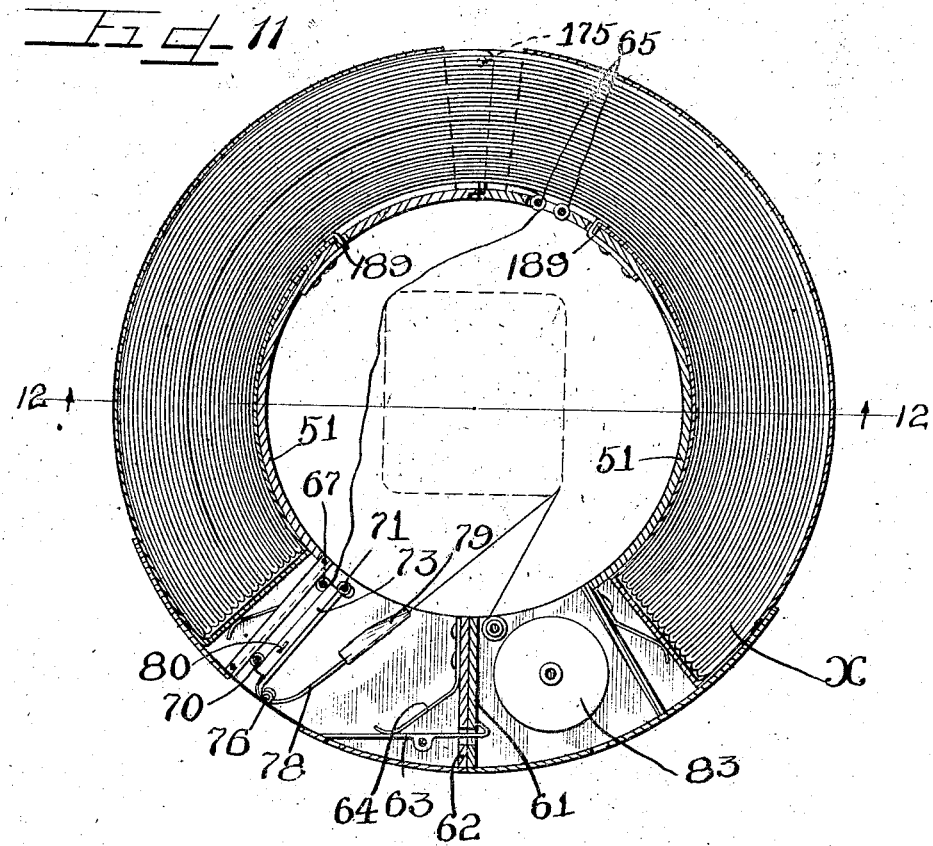

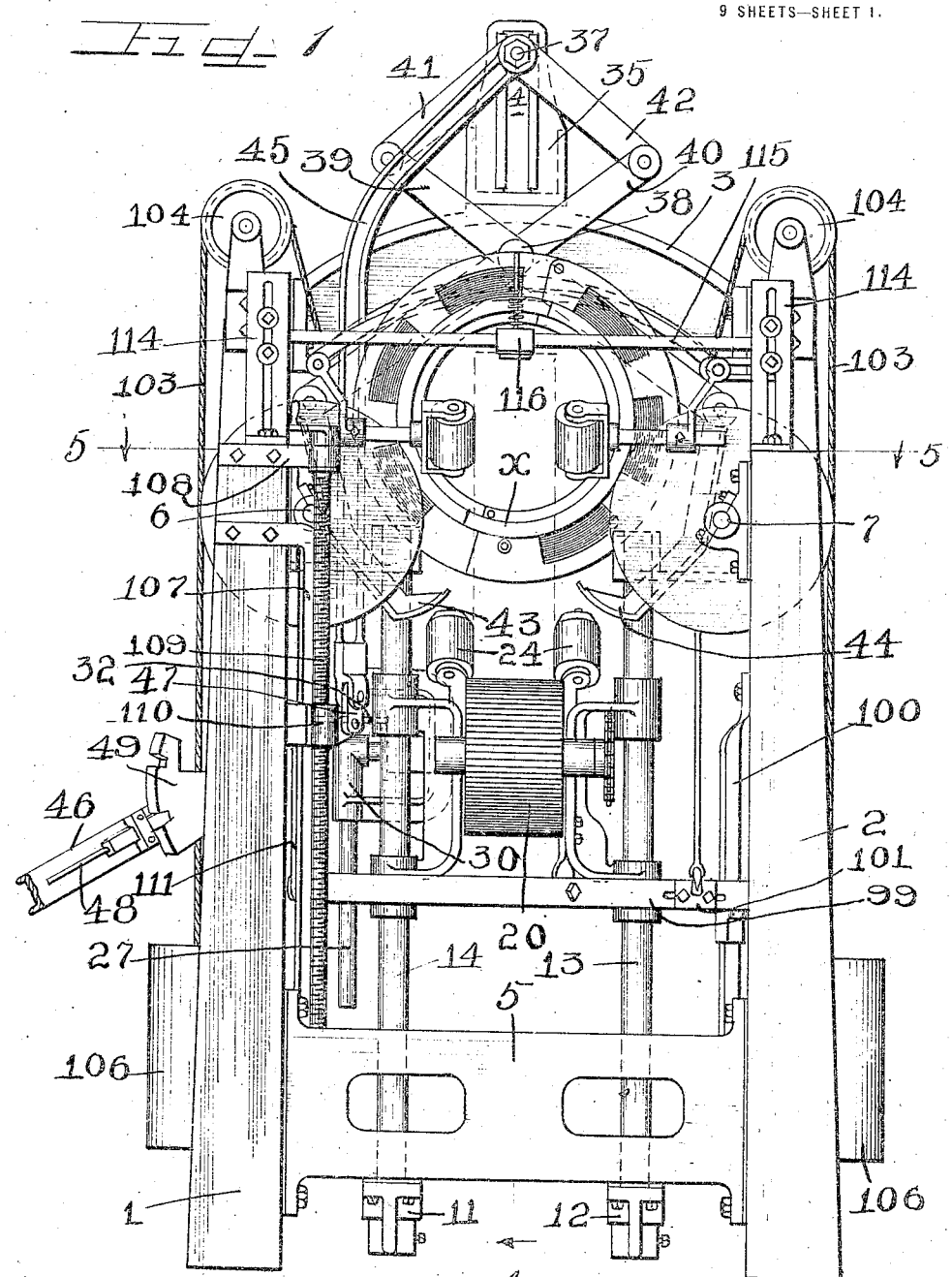

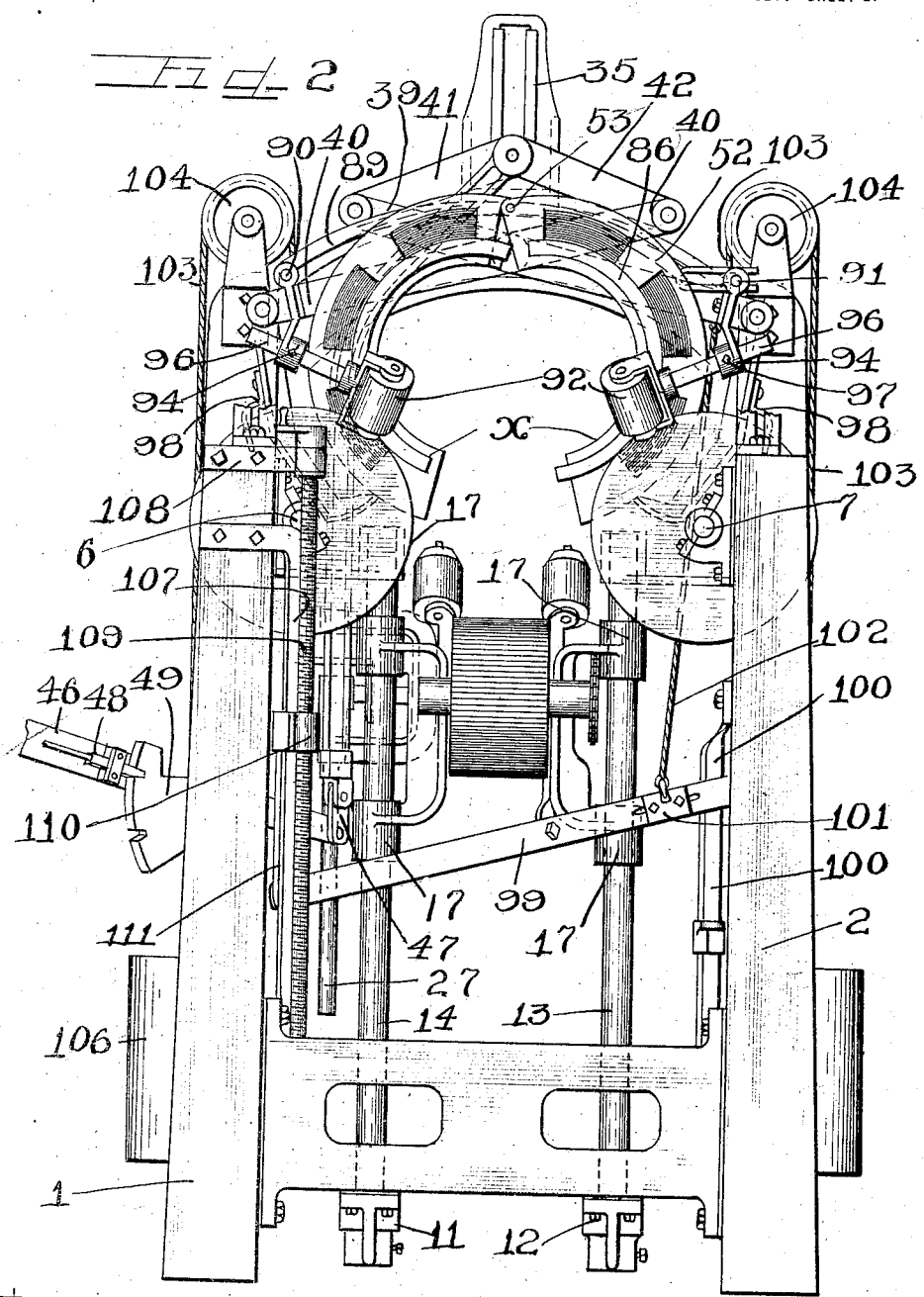

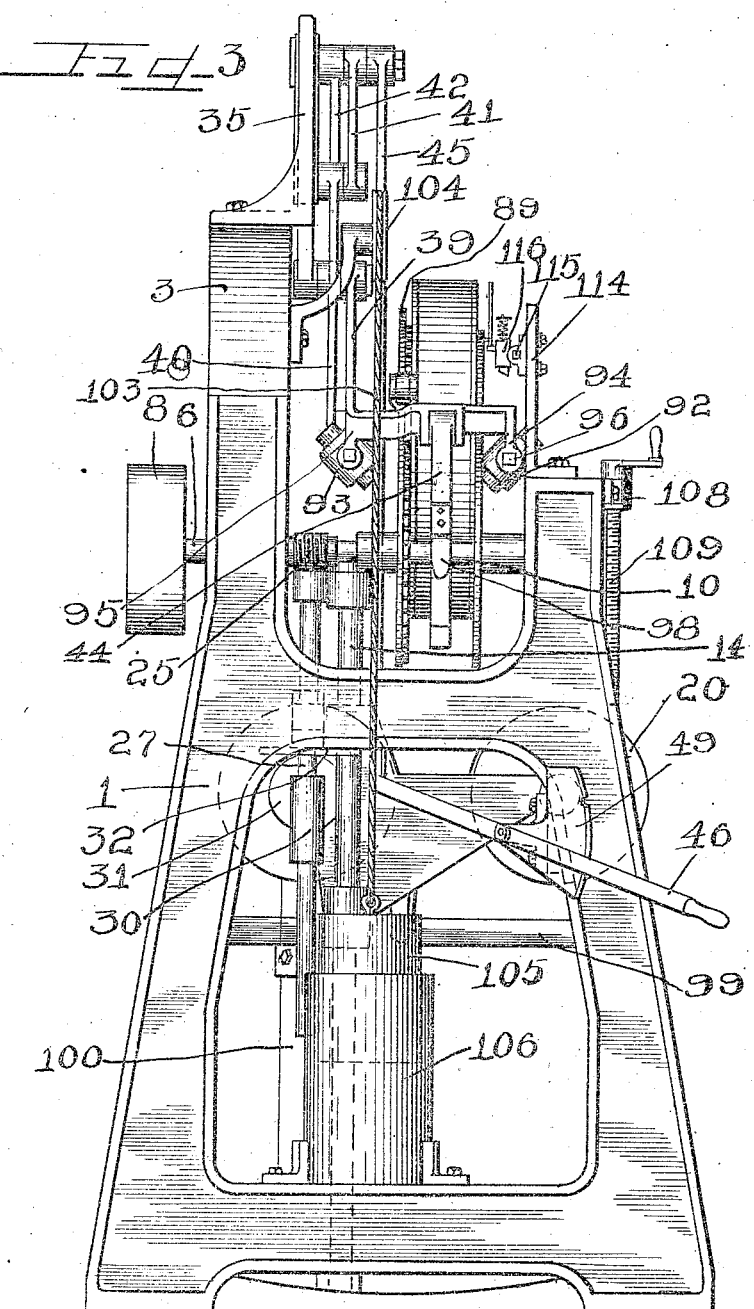

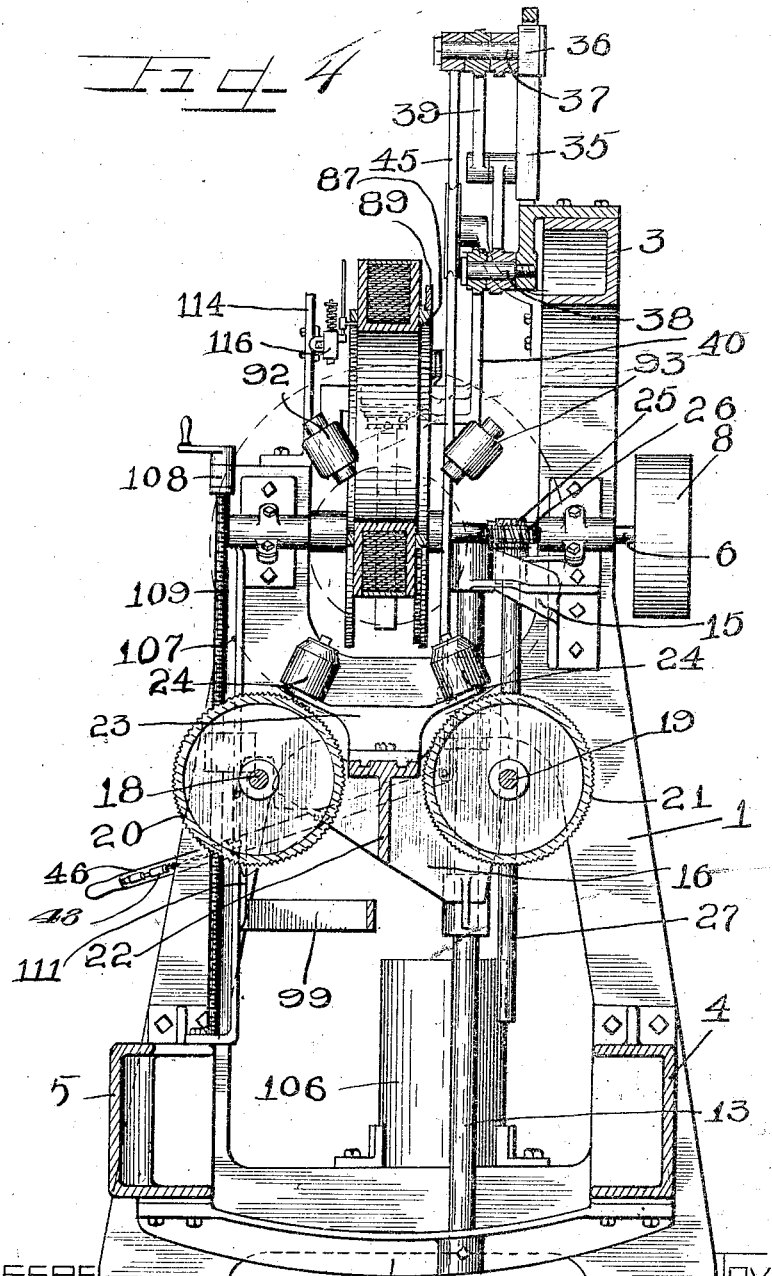

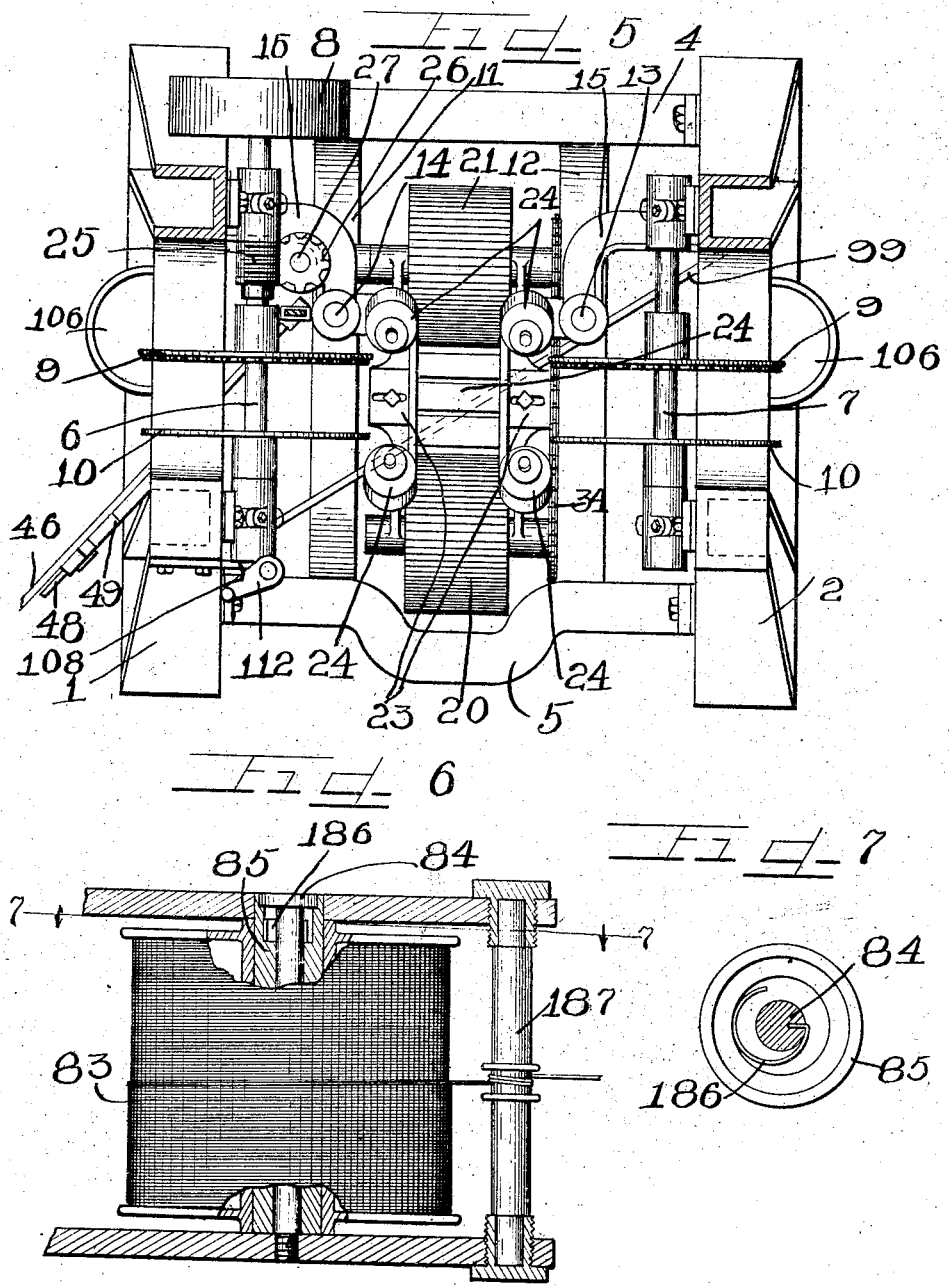

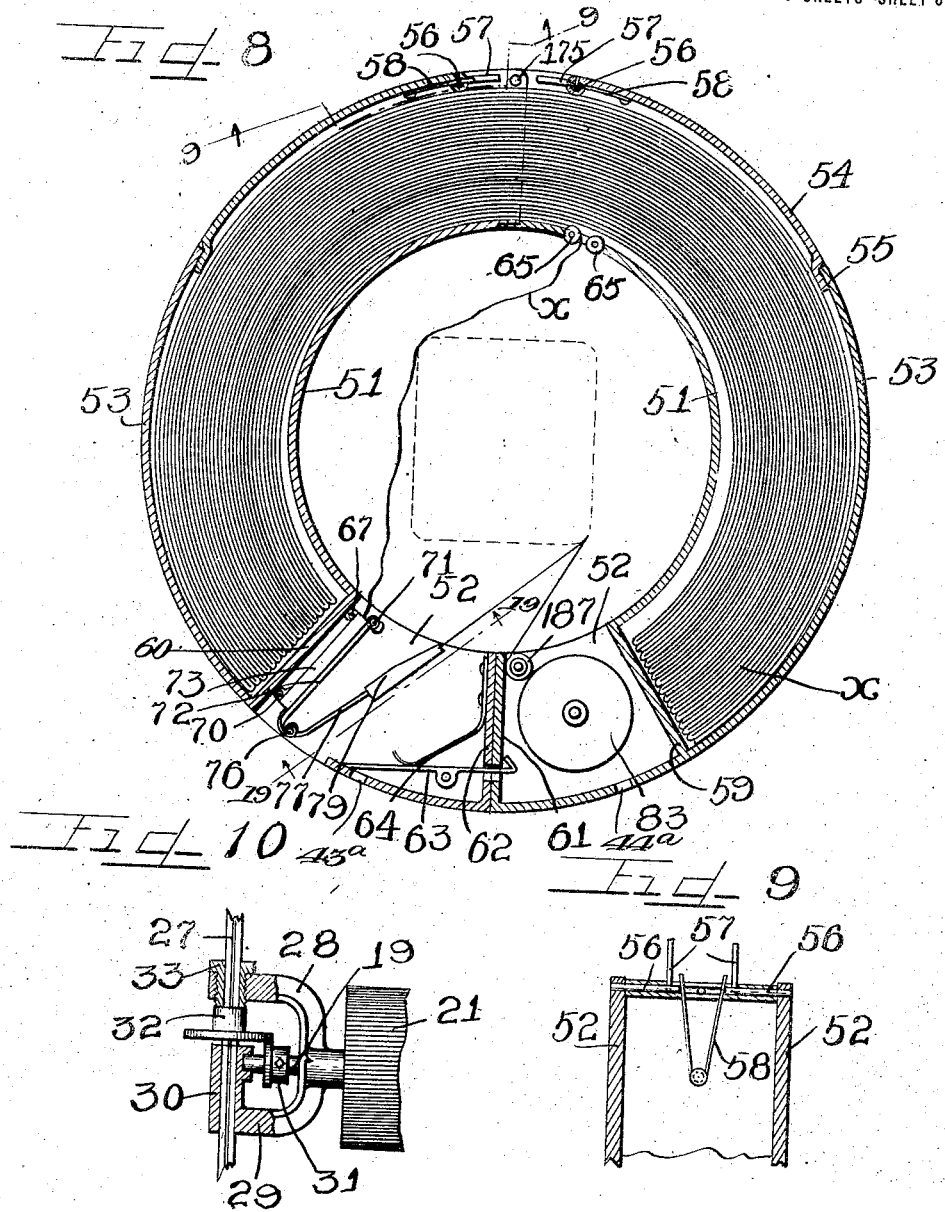

F. M. & W. B. PIERCE.
WRAPPING MACHINE.
APPLICATION FILED AUG. 11, 1910.

1,158,406.

Patented Oct. 26, 1915.
9 SHEETS—SHEET 7.

Witnesses
J. W. Angell
Charles Tilloy

Inventors
Frank M. Pierce
William Burgess Pierce
By Charles Tilloy Atty

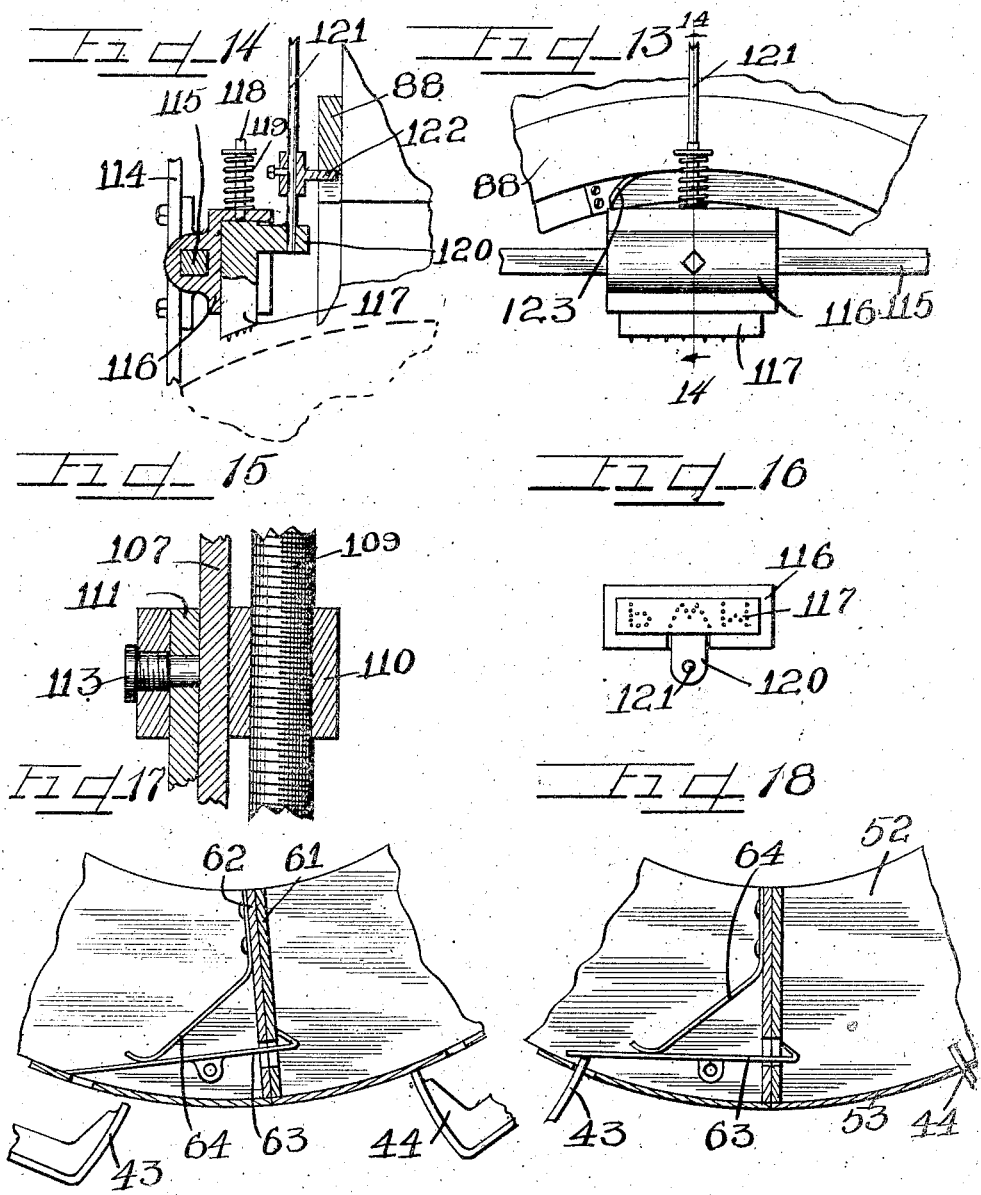

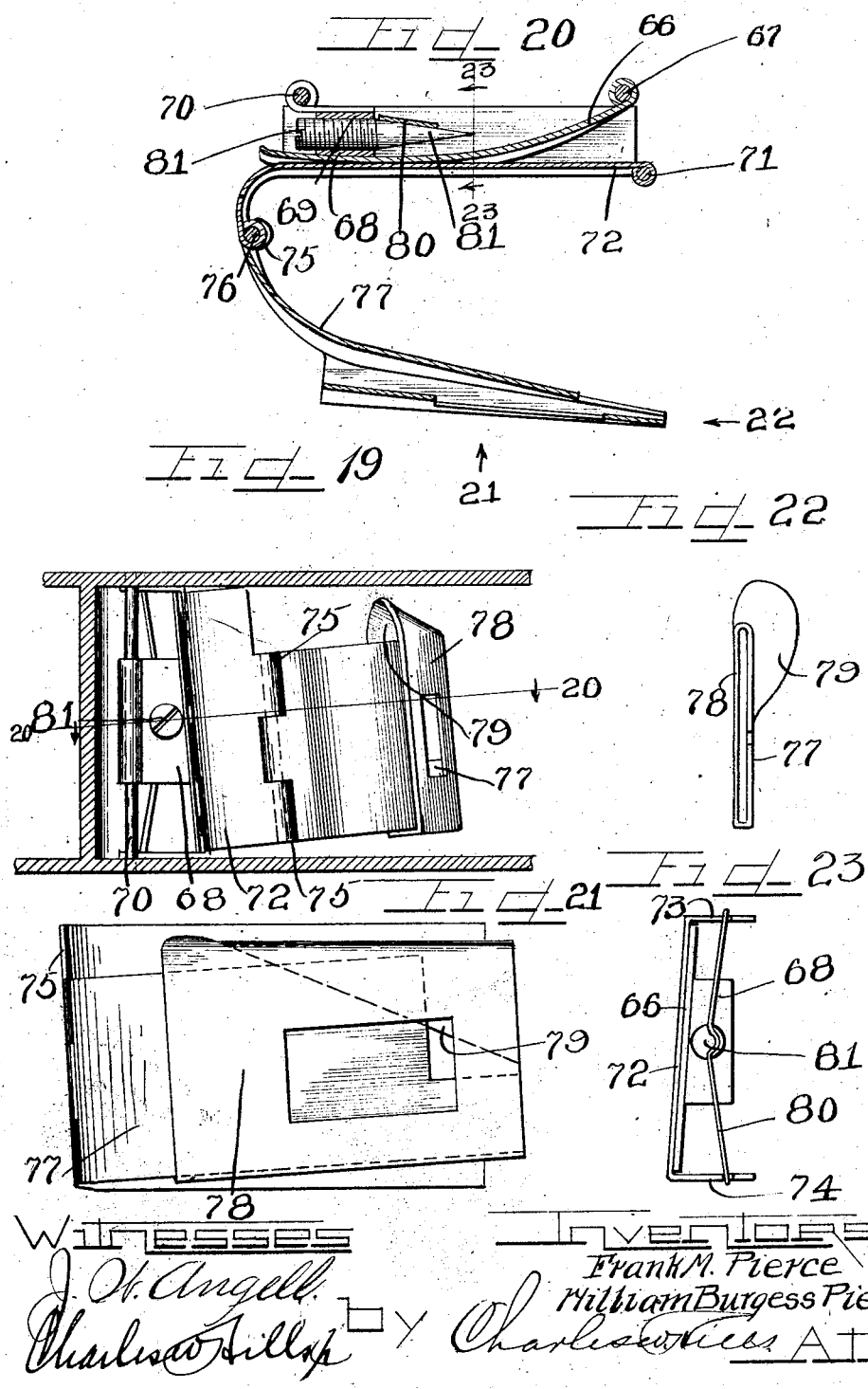

UNITED STATES PATENT OFFICE.

FRANK M. PIERCE AND WILLIAM BURGESS PIERCE, OF CHICAGO, ILLINOIS, ASSIGNORS TO PIERCE WRAPPING MACHINE COMPANY, OF CHICAGO, ILLINOIS, A CORPORATION OF ILLINOIS.

WRAPPING-MACHINE.

1,158,406.     Specification of Letters Patent.     Patented Oct. 26, 1915.

Application filed August 11, 1910. Serial No. 576,753.

*To all whom it may concern:*

Be it known that we, FRANK M. PIERCE and WILLIAM BURGESS PIERCE, citizens of the United States, and residents of the city of Chicago, in the county of Cook and State of Illinois, have invented certain new and useful Improvements in Wrapping-Machines; and we do hereby declare that the following is a full, clear, and exact description of the same, reference being had to the accompanying drawings, and to the numbers of reference marked thereon, which form a part of this specification.

Many articles of annular form are now inclosed in a wrapping of tape, paper or other suitable material wound about the same, both to protect the same from injury during transportation and while in stock, and also to retain the package in shape at all times and in the case of such articles as coils of wire, prevent any injury to the coil. Such articles include coils of wire (insulated and uninsulated), automobile tires, and many other objects of annular form. Heretofore such coils or annular objects have usually been wrapped by hand, and for this purpose a roll of the fabric, tape or strip affording the wrapping material is threaded through and through the eye of the coil or object and wound spirally about the coil, until the wrapping is completed. This, of course, is a tedious operation, and of necessity is expensive owing to the length of time required to manually wrap each article or coil. Furthermore, it is practically impossible for the most skillful operator to wrap a coil or other annular object to insure practically uniform tension of the wrapping at all points. In consequence, for many articles manual wrapping has not proven satisfactory as tending to deform the article wrapped. This is true with reference to automobile tires and numerous other articles.

In most of the mechanically operated wrapping machines heretofore devised, considerable difficulty has been experienced in providing means for carrying the wrapping material (as, for instance, the paper strip), about the article to be wrapped, and, owing to the fact that the eye or opening through the article or coil wrapped is usually small, but a small quantity of the wrapping material can usually be carried in the machine at one time, in consequence, necessitating frequent stoppages for replenishing the machine with the wrapping material or tape, thus causing large waste of time.

The object of this invention is to provide a wrapping machine of the class set forth in our prior application for patent for "Wire wrapping machines," filed on the 21st day of May, 1909, Serial No. 497,528, and in which a rotating annular shuttle carrying the wrapping material was rotated continuously around and through the coil or object to be rotated, which latter was continuously rotated at a less rate during the wrapping operation.

It is also an object of the invention to provide in a machine of the class described a shuttle of the utmost possible capacity for the wrapping material, and provided with means whereby the wrapping material is directed spirally around the article to be wrapped.

It is also an object of the invention to provide in the shuttle a peripheral chamber adapted to be filled by a folded paper or strip to be used in wrapping, and also to utilize the centrifugal tendency of the mass or carton of paper or wrapping strip to permit the strip to be progressively withdrawn from the shuttle in wrapping without the breaking or tearing of the strip.

It is also an object of the invention to afford a shuttle providing an interior peripheral elongated chamber adapted to be filled with the wrapping material folded in a length to fit peripherally in the chamber and also to provide a transverse feed slot in the inner periphery of the shuttle through which said strip may be drawn in wrapping, thereby enabling the centrifugal force of the wrapping material to be utilized in minimizing the pressure exerted against the withdrawal of the strip.

It is further an object of the invention to afford mechanism whereby the paper or other strip may be directed at any preferred angle with the axis of either the shuttle or the article to be wound, thereby insuring a continuous spiral winding.

It is also an object of the invention to afford mechanical means for simultaneously wrapping such articles both with a tape or strip of paper and with a wire or analogous material, and to afford a simple, durable and high speed machine for the purpose specified.

These, and the other objects of the invention, will be obvious from the matters hereinafter contained.

Figure 12:
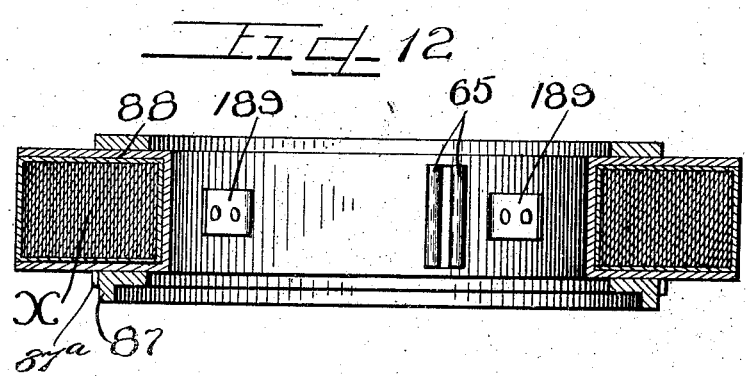

In the drawings illustrating a preferred form of our invention, Figure 1 is a front elevation of the machine, showing the parts in operative position and indicating in dotted lines the coil or other article to be wrapped. Fig. 2 is a similar view but with the shuttle opened to permit the insertion or removal of the coil or other annular object. Fig. 3 is a side elevation of a device embodying our invention. Fig. 4 is a section taken on line 4—4 of Fig. 1. Fig. 5 is a section taken on line 5—5 of Fig. 1. Fig. 6 is an enlarged view in elevation of the wire reel, with parts broken away. Fig. 7 is an enlarged detail of the retarding device for the reel, taken on line 7—7 of Fig. 6. Fig. 8 is an enlarged central section of the shuttle and its contents. Fig. 9 is an enlarged fragmentary detail taken on line 9—9 of Fig. 8 and illustrating the means for releasably engaging the removable peripheral wall section of the shuttle. Fig. 10 is an enlarged fragmentary detail partly in section, of the drive for the feed rolls. Fig. 11 is a slightly modified view of the shuttle and contents. Fig. 12 is a section taken on line 12—12 of Fig. 11. Fig. 13 is an enlarged detail in front elevation of the marking mechanism. Fig. 14 is a section on line 14—14 of Fig. 13. Fig. 15 is an enlarged view in vertical section of the adjusting mechanism for the feed and guide rolls. Fig. 16 is a bottom plan view of the marking die. Fig. 17 is an enlarged sectional detail of the shuttle, and lifting fingers, the latter approaching position to engage the shuttle to lift and open the same. Fig. 18 is a similar view at the moment just prior to the opening of the shuttle. Fig. 19 is a section on line 19—19 of Fig. 8. Fig. 20 is a section on line 20—20 of Fig. 19. Fig. 21 is a view in elevation taken in the direction of the arrow 21, on Fig. 20. Fig. 22 is a view in elevation taken in the direction of the line 22 on Fig. 20. Fig. 23 is a section on line 23—23 of Fig. 20.

As shown in said drawings, a frame of cast iron or any suitable material is constructed comprising end frame members 1 and 2, which, if constructed of cast iron, may be each made in one piece and which are connected at their top by means of an upwardly arched beam 3, rigidly bolted to the upwardly directed ends of said side frame members at the rear of the machine. Rigidly bolted to connect said side frame members at the bottom thereof and at the front and rear sides of the frame are beams 4 and 5, cast in any suitable shape to afford the requisite strength and rigidly bolted between said frame members.

Journaled in suitable bearings on the inner side of each of said side frame members and at a suitable height, are horizontal shafts 6 and 7, and on the end of the shaft 6, (which protrudes at the rear of the machine) is a driving belt pulley 8. Secured on each of said shafts are parallel driving disks 9 and 10, which are spaced a sufficient distance apart to engage therebetween the shuttle hereinafter more fully described, to drive the same.

Connecting the lower beams or bars 4 and 5, are transverse bars 11 and 12, and rigidly secured therein at their lower ends and extending upwardly in parallel relation, are cylindric guide bars 13 and 14, which, at their upper ends, are rigidly engaged in brackets 15, securely bolted on the side frame members, thereby holding said guide bars in rigid and unvarying relation. Adjustably supported and slidable on said guide bars is a feed carriage 16, which, as shown, is provided at each end thereof with upwardly and downwardly directed arms, each provided with a sleeve 17, to receive said guide bars therethrough and on which said carriage may be freely adjusted. Journaled upon shafts 18 and 19, secured in said carriage, are feed rollers 20 and 21, the peripheries of which are corrugated or in any manner suitably shaped to engage to drive rotatably the article supported thereon. As shown also, and rigidly connecting the end members of said carriage, is an integral bar 22, on which is slidably engaged the brackets 23, for the rollers 24, as shown four in number, two on each side of said pair of feed rollers 20 and 21, as shown in Fig. 5. The top of the carriage 16, is provided with a plurality of slots suitably milled for the purpose, which interfit the parts on which said brackets are secured, and, as shown, the base upon which each pair of arms is secured is provided with a central slotted aperture to receive a bolt whereby said arms are firmly held when in adjusted position, thereby permitting the same to be adjusted inwardly or outwardly to suit the thickness of the coil or annular object to be wrapped. Said feed rolls are driven from the driving shaft 6. For this purpose a worm 25, is secured on said driving shaft and meshes with a worm gear 26, on the upper end of a shaft 27, journaled vertically in suitable bearings on the side frame member 1, as shown in Figs. 3 and 4.

The end of the shaft 19, for the rear feed roll 21, extends rotatably through a yoke having an upper arm 28, and a lower arm 29, and integrally connected with said lower arm is a sleeve 30, directed upwardly at a right angle therewith and in which the shaft 27, is journaled. The extremity of said shaft 19, is also journaled in a suitable bearing near the upper end of said sleeve, as shown in Fig. 10. Within the yoke so formed and adjustably secured on the shaft by means of a set screw or any suitable means is a friction roller 31, and slidably secured on said shaft 27, is a driving friction member 32, which is provided with an internal key which fits in a keyway in said shaft 27, extending for a considerable portion of the length of said shaft, thus permitting any desired vertical adjustment of the feed table without interfering with the drive of the feed roll 21. As shown, said driving friction member 32, is at all times held in positive engagement with the friction roller 31, by means of an adjusting bolt 33, which is threaded through the upper arm 28, of the yoke and in which said shaft 27, is journaled, and which may be adjusted to permit any desired degree of pressure to be exerted on the driving friction to force the same firmly into engagement with the friction roller 31. Of course, the speed of rotation of the feed roll 21, may be varied by shifting the friction roller 31, inwardly or outwardly with reference to the driving friction 32, this being readily accomplished by loosening the set screw or screws in said friction roller to permit the same to be shifted on the shaft.

As shown, a driving chain 34, is trained about suitable sprocket wheels secured on the respective shafts 18 and 19, thus driving said feed rolls in unison to continuously rotate any circular body such as a coil of wire, an automobile tire casing or any other object supported thereon between the guide rollers and which it may be desired to wrap.

Secured upon the arched beam 3, at the top of the machine is a standard 35, having a vertical slot extending therethrough from the bottom to near the top thereof. Secured on a cross-head 36, slidable in said slot, is a stud shaft 37. Rigidly secured in the beam 3, and directly beneath the stud shaft 37, is a corresponding shaft 38, and journaled on the stud shaft 38, are crossed levers 39 and 40, the upper ends of which are pivotally connected with toggle bars 41 and 42, journaled on the stud shaft 37, as shown in Figs. 1 to 4 inclusive. The lower ends of said levers 39 and 40, extend to near opposite sides of said machine, and at their extremities are pivotally engaged with the grappling hooks, one on each side of the machine which extend downwardly and inwardly over the shafts 6 and 7 respectively and between the disks 9 and 10, and are each provided with an upwardly and inwardly directed finger 43 and 44 respectively, of which the finger 44, secured on the toggle bar or lever 39, is slightly longer than the finger 43, and is adapted to first engage the shuttle X, (hereinafter more fully described), to centralize the same for engagement with the other of said hooks preliminary to lifting and opening the shuttle with the upward movement of the table and the article to be wrapped thereon.

Pivotally engaged on the stud shaft 37, is a downwardly extending curved arm or connecting rod 45, with the lower end of which the lever 46, is connected by means of a link 47, as shown in Figs. 1 and 2. A spring detent 48, is provided on said lever adapted to engage the notched segment 49, secured on the side frame member 1, so that when said lever is shifted upwardly the cross-head 36, carrying the stud shaft 37, is drawn downwardly thereby throwing the lower or free end of the toggle levers 39, and 40, upwardly, thus throwing the grappling hooks into engagement with the shuttle to lift and open the same, as shown in Fig. 2.

The shuttle comprises an annular casing constructed of any suitable material and which may be in two sections, equal or otherwise, as preferred, and comprises an inner wall 51, and side walls 52, which conveniently are apertured to permit inspection of the contents. Said sections as shown in the drawings, are hinged together by means of a bolt or pintle 175, engaging the meeting sections of each side wall together, but affording no obstruction to the interior of the shuttle. In the preferred construction illustrated in Figs. 8 and 9 the outer wall 53, of each of said sections extends from the point of division between said sections peripherally toward the hinge for approximately half the semi-circumference and a removable wall or cover section 54, is provided to close the remainder of the periphery of said shuttle from the end of the permanent wall section 53, to near the hinge. For this purpose, as shown, said removable wall section or shutter is provided at its inner end with an inwardly directed flange 55, adapted to engage within the end of the permanent wall section 53, as shown in Fig. 8, and extending through the end of said section adjacent the hinge are dowel pins 56, slidable in said shutter section and adapted to engage any suitable apertures in the side walls 52, of the shuttle, as shown in Figs. 8 and 9. Secured to said dowel pins are outwardly projecting pins 57, adapted to be manually engaged to retract said dowel pins against the tension of the spring 58, to permit removal of said cover section from the shuttle, thereby opening the shuttle for the insertion of a fresh supply of the wrapping material.

Each of the sections is provided with an end wall 59 and 60, respectively limiting the compartment for the wrapping material and at the extremity of each of said sections is an end or terminal wall 61, 62, which close flat together when the shuttle is closed, as shown in Fig. 8, and pivotally engaged in the compartment afforded between the transverse walls 60 and 62, in one of said sections, is a spring pressed latch 63, the bolt of which normally projects when the sections are closed together through registering apertures in the end walls 61 and 62, to lock said sections in their closed relation, and, as shown, a leaf spring 64, is engaged on the transverse wall 62, and presses upon the tail of said lever or latch 63, to hold the same at all times in locking engagement.

Opening through the peripheral walls 53, between the transverse walls 59—61, and 60—62, are apertures 43ᵃ—44ᵃ adapted to receive therein the claws 43—44 respectively, whereby the latch 63, is first retracted to permit opening of the shutter sections afforded by the elevation of the shutter on said hooks, as shown in Fig. 2, with the upward movement of the free ends of the toggle arms 39 and 40.

In the construction shown, the paper strip or other wrapping material, is first folded back and forth upon itself in folds approximately equal in length to the length of the shuttle chamber for the wrapping material and the material so folded is confined within the shuttle, as shown in Fig. 8. The inner end of the wrapping strip $x$, is drawn between two parallel transverse rollers 65, arranged one on each side of a transverse slot through the inner wall 51, of one of said shuttle sections, and thence threaded through a mechanism carried within the compartment between the transverse wall 60 and 62, of one of said sections, which acts to fold the material upon itself longitudinally as the strip is drawn therethrough during the wrapping operation, and which also is capable of being set obliquely with the plane of the annular body being wrapped or with the plane of one of the side walls of the shuttle, as shown in Figs. 19 to 23 inclusive. For this purpose, as shown, a convex tension plate 66, is secured in the chamber or compartment of the shuttle section, as shown, that containing the latch or bolt 63, and by means of a pin or rivet 67, which engages through a suitable eye at the inner end thereof and in the side walls of the shuttle, as shown in Figs. 8, 11, 19 and 20. Said curved tension plate is inclined obliquely with the plane of the side wall of the shuttle and at its rear end or that adjacent the outer periphery of the shuttle, a block 68, is secured thereon and provided with a centrally threaded aperture therethrough substantially parallel with the side walls of the chamber and directed longitudinally of said plate. A clip 69, is rigidly secured to said block and provided with an eye through which extends a rivet or pin 70, the ends of which engage in the side walls of the shuttle as before described with reference to the rivet or pin 67.

Swingingly engaged upon a pin or rivet 71, near the inner periphery of the side walls of the shuttle, as shown in Fig. 20, is an inclined channel member, the web 72, of which is inclined to correspond with the inclination of the plate 66, as shown in Figs. 20 and 23. Flanges 73 and 74, integral with the edges of said web are turned outwardly therefrom to receive the plate 66, therebetween and the rear or outer end of said plate 72, is curved outwardly and forwardly and provided with apertured knuckles 75. Hingedly engaged with said rear or outer end of the plate 72, by means of a pintle 76, extending through the interfitting knuckles thereof, and said plate is a folder nozzle comprising a plate of metal 77, curved forwardly and inwardly, as shown in Figs. 19 to 22 inclusive. Said folder nozzle comprises a plate or plates of metal, the back plate 77, of which is inclined upwardly and inwardly obliquely with the axis of the annular article to be wrapped. Said back plate is cut away near its forward end from its upper edge to afford a relatively sharp upwardly directed corner near its inner extremity, as shown in dotted lines in Fig. 21, and in full lines in Fig. 20, and integrally connected with the lower edge of said plate is an outwardly flaring and inwardly converging folder head embracing a plate 78, which is folded upwardly, substantially parallel with the plate 77, and over the upper edge thereof and the free edge thereof extends downwardly alongside said back plate and is cut to afford a downwardly and inwardly directed oblique edge 79, which extends to near the angle at the extremity of the back plate 77, and acts to fold the paper or other wrapping strip when the same is drawn therethrough and over the corner of the plate 77.

Extending through the flanges 73 and 74, of the back plate, is a leaf spring 80, adapted to be engaged by the tapered end of the tension screw 81, thereby acting to hold the plate 72, at all times with more or less tension against the tension plate 66. The oblique arrangement of the nozzle and tension plate within said compartment is such as to insure a suitable spiral wrapping of the material about the annular body to be wrapped.

It frequently is important to bind the wrapping material in place as applied either by a fine wire wrapping or by wrapping the material with a strong cord. For this purpose a spool 83, of wire cord or any suitable material (preferably wire) is removably journaled in the appropriate compartment in the section other than that containing the nozzle aforesaid. For this purpose a screw shaft 84, extends through said spool and a sleeve or bushing 85, at the axis of said spool, and firmly engages in the side wall of said section.

A spring tension member 186, is secured to the shafts 84, near the upper end thereof and is seated in a suitable chamber in said sleeve 85, and acts to retard rotation of the spool, and, as shown, the wire, cord, or other suitable material is drawn one or more times about a roller or spindle 187, which thereby serves as a tension member to regulate the withdrawal of the material from the spool. Said wire or other suitable material is led around said spindle, is secured about the coil or annular object, and is wrapped with the paper around and through the same by the continuous rotation of said shuttle.

In the shuttle illustrated in Fig. 11, the construction is substantially in all respects as before described, with the exception that the folded wrapping strip is first laid into a carton or cartridge 88, constructed as shown of thin sheet metal and the carton or cartridge containing said folded strip is then placed in the shuttle substantially as before described, and is firmly retained in its place by detents 189, secured one in each section and adapted to protrude through the wall thereof to engage the cartridge.

Except when operated at high speed, the weight of the shuttle and its contents is sufficient ordinarily to hold the gear 87ª at all times in engagement with the driving gears 9, on the shafts 6 and 7, while the rim 86, on the outer face of the shuttle tracks on the periphery of the disk or wheel 10, secured on the shaft 7, and the rim projecting beyond the gears 9, tracks upon a laterally projecting rim 87, on the rear side of the shuttle. Thus the shuttle is at all times supported in operative position with the teeth of the respective gears in mesh.

At the high speed at which this machine is frequently operated, a tendency might exist for the shuttle to jump upon its bearings on said wheels or disks owing to any slight inequality in balance due to variation in the quantity of wrapping material in the shuttle. To obviate this a radius bar 89, is pivotally engaged at one end near the lower extremity of the toggle bar 40, by means of any suitable shackle or hinge joint 90, and extends over the shuttle and bears at all times upon the rim 87, before described. The opposite end of said radius bar is slotted, as shown in Figs. 1 and 2, and engaged in said slot is a shackle pin 91, which extends through a suitable knuckle on the lower end of the toggle bar 39. Inasmuch as the grappling hooks are pivotally engaged on the lower ends of said toggle bars 40 and 39, and operate over the shafts 6 and 7, as fulcrums to swing inwardly to engage, and outwardly to disengage the shuttle in lifting the same, as shown in Fig. 2, or deposit the same again in bearing in operative relation, as shown in Fig. 1, it follows that said radius bar is in positive bearing on the shuttle when the same is in running position.

Guide rollers 92 and 93, are provided on each side the shuttle opposite the eye thereof, to direct the article to be wrapped accurately therethrough in its rotation. For this purpose, the end of each of the toggle bars 39 and 40, at its lower extremity is directed forwardly and provided with downwardly directed extensions 94 and 95, as shown in Figs. 1, 2, and 3, and each of said downwardly directed extensions is provided with a bore therethrough in which is adjustably engaged the shank 96, carrying at its inner end said roller. Any suitable means may be provided for engaging said shank in place. A set screw 97, however, is shown. As shown also in Figs. 2 and 3, the grappling hooks slide over shafts 6 and 7, and are pivotally engaged in a suitable bearing in the transversely directed end of said toggle bars and each thereof is provided with a downwardly directed open hook 98, which fits over said shaft and insures the retraction or disengagement of the hooks 43 and 44 from the shuttle when the shuttle is lowered to upright position. Mechanism is also provided for manually adjusting the supporting table for the work to suit the size of the coil or article to be wrapped, and also counterbalancing means are provided to assist in the elevation of the shuttle and the release of the article therefrom when completely wrapped. In accomplishing these two objects, a lever 99, is fulcrumed on the table 16, as shown in Figs. 1 and 2, and extends diagonally of the machine beneath the table 16, with the rearwardly directed end thereof engaged to slide vertically between one of the legs of the machine, and a retaining strap or bar 100, bolted thereto. An adjustable clip 101, is secured on the rearwardly directed end of said lever and connected therewith and with the lower end of the toggle bar 39, is a cable or line 102. Also connected with the downwardly directed ends of the toggle bars 39 and 40, are cables 103, which are trained over suitable pulleys or sheaves 104, suitably supported on the frame and on the lower ends thereof on the outer side the machine are secured counterweights 105, which are partly contained within a suitable casing 106, supported upon the base of the machine and which descend thereinto as the shuttle is lifted.

For the purpose of adjusting the table to suit different sizes of packages a guide bar 107, is secured by suitable brackets to the front leg of the machine adjacent the forward end of the lever 99. Said guide bar extends vertically on the inner side of said leg and is secured thereto at both the bottom and the top thereof. Journaled in a suitable bracket 108, above said guide bar 107, is a vertically extending screw shaft 109, which is threaded through a nut 110, which at its side adjacent said guide bar is slotted to receive the guide bar therein and also the upper end of a link 111, which is pivotally connected with the forward end of the lever 99, and as shown, a set screw 113, is threaded through the rear side of said nut 110, and engages in a suitable aperture in the upper end of said link, as shown more plainly in Fig. 15. From the construction described it is obvious that rotation of said crank acts to shift the nut 110, upwardly or downwardly on the screw shaft and slide bar 107, thereby elevating or depressing the carriage proportionately to the adjustment of the nut effected.

We have also provided means whereby the wrapping material may be marked appropriately with an advertisement or other desired information, trade-mark, or data during the wrapping operation. For this purpose, as shown, brackets 114, are provided on the frame and slidably supported thereon at its ends is a bar 115, on which is secured at approximately its middle, a bracket 116, in which is slidably supported a head or die 117, provided with a stem 118, which extends upwardly through an aperture in said bracket and upon which is secured a spring 119, acting always to hold said head in elevated position. A rearwardly extending arm 120, is provided on said head and extending upwardly therefrom is a rod 121, having a tappet finger 122, which projects in close proximity with the rim 88, on the face side of the shuttle. Secured on the inner periphery of said rim is an inclined or cam face 123, which, with each rotation of the shuttle, acts to strike said tappet arm (and thereby the head) downwardly against the wrapper while the spring instantly retracts said head after the passage of the cam past the tappet arm or finger. While we have shown in the drawings perforating points on said heads for the purpose of marking the paper, it is obvious that any suitable marking device may be employed, including, if we prefer, a stencil roller of familiar type adapted to rotate on the wrapper by friction when forced downwardly thereon.

The operation is as follows: The machine is, of course, first adjusted to elevate the table to a point to permit the shuttle to close freely through the eye of any annular object supported on the table, as, for instance, a coil of wire, an automobile tire or any of the numerous annular objects it may be desired to wrap. To insert the object or article, the lever 46, is swung upwardly to the position shown in Fig. 2, whereupon the upward and outward movement of the lower ends of the toggle bars 39 and 40, act to rock the grappling hooks inwardly over the shafts 6 and 7, until the grappling finger or hook 44, (which, as before stated, is somewhat longer than the corresponding hook or finger 43, on the other side of the machine) engages in the aperture therefor in the outer peripheral wall of the shuttle, thereby instantly stopping further rotation of the shuttle and centralizing the same for the reception of the hook 43, which immediately engages therein, thereby releasing the latch and swinging the shuttle open on its driving gear but remaining in mesh therewith. This, of course, lifts the shuttle on said hooks to the position shown in Fig. 2. Such upward movement, where the eye of the wrapped articles is small is accompanied by an upward movement of the table occasioned by the shaft of said toggle arm 39, by means of the cable 102, on the lever 99, and this upward movement both of the table and the shuttle is counterbalanced by the weights before described, thus rendering the movement extremely easy. The upward movement of the table, of course, is not necessary ordinarily and where the eye is large the cable 102 may be detached from the lever 99.

An important object is accomplished by slightly elevating the table with the coil thereon simultaneously with the upward movement and opening of the shuttle, in as much as this permits ready retraction of the shuttle from small annular objects or coils in which the eye or opening therethrough is so small as otherwise to endanger the wrapping by the dragging of the ends of the shuttle sections therepast. Such upward and opening movement of the shuttle is also accompanied by the retraction of the guide rollers 92—93 before described, for the obvious reason that being secured on the ends of the toggle bars, said rollers must of necessity vary in adjustment therewith.

Having removed the wrapped article from the table, a fresh coil is inserted thereon, the lever 46, swung downwardly to the position shown in Fig. 1, thereby closing and lowering the shuttle into an operative position locked closed and the hook retracted. The end of the paper or wrapping strip drawn from the inner side of the folded package within the shuttle and between the rollers 65, is then drawn between the tension plate 66, and plate 72, thence around the hinge 75, and through the nozzle and the end thereof engaged in any suitable manner upon the coil or annular object to bind the same in place for the first one or more turns of the shuttle. In the same manner the wire for wrapping may also be drawn around its tension spindle and secured in any suitable manner for wrapping. Power being now applied, the shuttle is rapidly rotated through the eye of the object to be wrapped, the paper strip being drawn from the nozzle, and owing to the peculiar shape thereof, folded longitudinally to increase the strength thereof and wound in a uniform spiral in wrapping, this being accomplished independent of the size of the coil or object to be wrapped by the oblique arrangement of the nozzle which directs the strip at all times at an oblique angle with the periphery thereof.

Should the table not be sufficiently high, it may be quickly adjusted by means of the screw shaft 109, rotation of which in one direction serves to elevate the lever 99, carrying the table, and in the other direction serves to lower the same, thus enabling the table to be shifted as to height independent of the state of rest or motion of the machine. During the entire period of wrapping, the object wrapped (which we have for purposes of convenience merely mentioned as a coil) is continuously rotated, but usually at a low rate of speed, by means of the feed rollers 20 and 21, these being driven simultaneously and uniformly in the same direction by means of the worm and gear driving from the shaft 6, to the shaft 27, and thence through the medium of the friction disk 32, and friction roller 31, communicating the drive to the feed roller 21, and thence by means of the driving chain to the roller 20.

Should higher speed of rotation be required, owing to different sizes of coils, the speed may be varied by shifting the friction roller 31, inwardly or outwardly on its shaft to vary its radial distance from the center of the disk 32. The frictional bearing of the disk 32, on the friction roller 31, may be varied by the adjusting nut 33, as shown in Fig. 10.

The wrapping material, may, of course, be carried in the shuttle in any suitable manner. I have shown a preferred arrangement in which the wrapping material is folded in long lengths to afford a package of such paper of a length to fit within the communicating chambers therefor in the shuttle and when so arranged an important object is attained in withdrawing the paper or wrapping material from the inner side of said package, inasmuch as the centrifugal action due to the rotation of the shuttle holds said package outwardly, thereby relieving all pressure from the bottom or inner folds of the wrapping material.

While we have so described the shuttle and its contents, it is evident that the paper might be differently folded or even an auxiliary binder might be employed, should it be desired, and it is to be understood that in the constructions and embodiments of our invention herein shown and described, we have sought but to describe and illustrate a preferred form thereof, for obviously very numerous variations and modifications both in the structure and in the operation thereof may be effected without departing from the principles of our invention. We therefore do not purpose limiting ourselves otherwise than necessitated by the prior art.

We claim as our invention:

1. In a wrapping machine means acting to advance the article to be wrapped, a shuttle rotatable about the same having wrapping material laid in folds therein and adapted to be wound about the article to be wrapped as the shuttle is rotated.

2. In a wrapping machine means acting to advance the article to be wrapped, a rotatable shuttle adapted to receive wrapping material in folds and to dispose it about an object from the innermost of said folds.

3. In a device of the class described means for advancing the article to be wrapped, a rotatable shuttle adapted to contain wrapping material laid in folds, means directing the wrapping material spirally around the article, and manually operated mechanism for releasing the article when the wrapping is completed.

4. In a wrapping machine of the class described a frame, vertical guides thereon, a carriage movable on said guides, supporting and driving means for an article to be wrapped mounted on said carriage, a rotatable hinged shuttle adapted to be opened to permit insertion and removal of articles to and from the machine, and means for opening said shuttle and holding the same away from the article.

5. In a wrapping machine of the class described a frame, adjustable supporting means for articles to be wrapped, mechanisms associated therewith for driving said articles at different speeds, a rotatable shuttle hingedly constructed so as to be opened, and means forming a part of said machine for opening said shuttle and holding the same away from the article.

6. In a device of the class described adjustable supporting and driving means for articles to be wrapped, a hingedly constructed shuttle adapted to be opened to permit insertion and removal of articles to and from the machine, and toggle levers mounted on the machine and adapted to be operated to engage said shuttle to open the same and maintain the same away from the article in wrapping position.

7. In a wrapping machine of the class described a frame, vertically adjustable supporting and driving means for articles to be wrapped therein, a revoluble paper carrying shuttle hingedly constructed adapted to be opened to permit insertion and removal of articles to and from the machine, latching means for maintaining said shuttle in closed locked position, and means forming a part of said machine adapted to unlatch said shuttle and open the same and support the same away from the article in open position.

8. In a wrapping machine of the class described vertical guides, a carriage movable thereon, driving means associated with said carriage adapted to support and rotate an article to be wrapped, mechanism for adjusting said carriage on said guides, a revoluble paper carrying shuttle hingedly constructed to be opened to permit insertion and removal of articles to be wrapped to and from the machine, and toggle levers adjustably mounted at the upper end of the machine and adapted to be operated to engage said shuttle to open the same and hold the same elevated in open position.

9. In a device of the class described, a frame, an adjustable carriage, feed rollers on said carriage acting to support and rotate the article to be wrapped, an annular rotatable shuttle comprising hingedly connected segments adapted to be opened to receive the article to be wrapped through the eye thereof and affording when closed an unobstructed chamber to receive a package of folded wrapping material, and means for engaging the shuttle to centralize, open and move the same away when the article has been wrapped.

10. In a wrapping machine of the class described the combination with vertically adjustable supporting and driving means for articles to be wrapped, of a hingedly constructed shuttle adapted to be opened, hook members for engaging the shuttle for opening and maintaining the same elevated away from an article disposed in wrapping position, and toggle levers manually actuatable to cause opening of the shuttle.

11. In a wrapping machine of the class described a frame, a carriage adjustable therein, driving and supporting means mounted on the carriage for articles to be wrapped, a friction drive therefor, geared driving means therefor, and means to open and elevate said shuttle away from an article disposed in wrapping position.

12. In a machine of the class described a shuttle adapted to receive the article to be wrapped through the eye thereof, and affording an interior chamber for a package of folded wrapping material having layers arranged concentric with the axis of the shuttle, means for rotating the shuttle, and means for engaging the shuttle to open and move the same away from the article to be wrapped to permit its removal from the eye of the shuttle.

13. In a wrapping machine of the class described a frame, vertically adjustable mechanism for supporting an article to be wrapped therein, a revoluble shuttle adapted to be rotated through the eye of an article being wrapped, geared driving means for said shuttle, said shuttle constructed of hingedly connected sections adapting the shuttle to be opened, hook members adapted to engage the sections of the shuttle to open and elevate the shuttle away from an article disposed in wrapping position, and toggle levers manually actuatable and connected to said hook members for operating the same.

14. In a wrapping machine of the class described a frame, power driven means adjustably mounted therein to support and rotate an article to be wrapped, a power driven hingedly constructed shuttle adapted to be rotated through the article being wrapped to apply a wrapping thereon, means adapted to engage said shuttle to open and elevate the same away from the article disposed in wrapping position, and counterweighted actuating mechanisms for said means.

15. In a wrapping machine of the class described a frame, adjustable driving and supporting means for articles to be wrapped therein, a power driven annular shuttle mounted on said machine, said shuttle constructed of hingedly connected sections, hook members for engaging said shuttle sections to open the shuttle and elevate the same away from an article disposed in wrapping position, a bracket mounted on the upper end of said machine, and toggle levers slidably pivoted therein and connected to said hook members and adapted to be actuated for opening said shuttle and releasing the same to closed position.

16. In a wrapping machine of the class described a frame, adjustable supporting means for articles to be wrapped mounted thereon, a revoluble shuttle comprising sections hingedly connected to one another adapted to be opened, means latching said shuttle in closed position, and manually operated mechanism for unlatching said shuttle sections and opening the same into an elevated position away from an article disposed in wrapping position.

17. In a device of the class described, a frame, shafts journaled in said frame, driving disks secured on each of said shafts, a vertically adjustable carriage beneath said shafts, power driven feed rollers on said carriage acting to support and rotate the article to be wrapped, an annular shuttle adapted to be rotated by said driving disks and comprising hingedly connected segments adapted to be opened to receive the article to be wrapped through the eye thereof and affording when closed an unobstructed chamber to receive a package of folded wrapping material, and means for engaging the shuttle to centralize, open, and lift the same clear of the wrapped article.

18. In a wrapping machine, means acting to advance the article to be wrapped, a shuttle rotatable about the same and adapted to carry wrapping material therewith, and mechanism adapted to engage and move the shuttle away from the wrapped article.

19. In a wrapping machine for applying spiral wrapping, a rotatable shuttle, a crescent shaped chamber therein to carry the wrapping material, and means adapted to disengage said shuttle and remove the same from the article.

20. In a spiral wrapping machine an annular rotatable shuttle, a segment shaped chamber therein to contain the wrapping material for the article to be wrapped, and means adapted to disengage and move the shuttle from the article.

21. In a wrapping machine of the class described a frame, vertically adjustable supporting and driving means for articles to be wrapped, a sectional revoluble paper carrying shuttle adapted to be driven to rotate through the eye of an article being wrapped to apply a wrapping thereon, and counterweighted manually operatable mechanisms for engaging said shuttle and opening and elevating the same to permit removal of an article wrapped.

22. In a wrapping machine means for supporting and rotating an article in a vertical plane, a rotatable shuttle adapted to carry and dispose wrapping material about said article and means adapted to open and withdraw said shuttle from the article.

23. In a device of the class described an adjustable carriage, means thereon to support and rotate an article to be wrapped, a shuttle hinged to open, arms adapted to open and lift said shuttle from the article to be wrapped, and means attached thereto to hold said shuttle and said article in proper relation for wrapping.

24. In a machine of the class described, adjustable means for supporting and advancing an article to be wrapped, an annular rotatable shuttle comprising two half segments hinged to be opened and closed, a latch to lock said segments, arms adapted to unlock and life said shuttle in open position from the article, and means positively retaining said shuttle in either position.

25. In a machine for wrapping annular objects, feed rolls for supporting and rotating said object, a shuttle movable through the eye thereof having wrapping material loosely contained therewithin, guiding and tension mechanism for directing the wrapping material spirally around the article wrapped, means adapted to release the shuttle from the article when wrapped, and guide rollers acting to support the article wrapped against the tension exerted in wrapping.

26. In a device of the class described a frame, an adjustable carriage thereon, feed rollers on said carriage acting to support and rotate an article to be wrapped, an annular rotatable shuttle comprising hingedly connected sections adapted to be opened to receive the article to be wrapped through the eye thereof and when closed affording an unobstructed chamber to receive wrapping material for application to the article, means on said frame for engaging the shuttle sections, and mechanism adapted to operate said means to centralize, open and elevate the shuttle away from the article disposed in wrapping position.

27. In a device of the class described feed rollers to support and rotate an article to be wrapped, an annular rotatable shuttle comprising hingedly connected sections adapted to be opened to receive the article to be wrapped engaged through the eye thereof, latching means for said shuttle sections to hold the same locked together and means mounted on said frame and manually actuatable to unlatch said shuttle sections and swing the same into open position.

28. In a wrapping machine of the class described a frame, an adjustable carriage mounted thereon, feed rollers on said carriage acting to support and rotate the article to be wrapped, a variable speed friction drive therefor, an annular rotatable shuttle comprising hingedly connected sections, latching means therefor, and counterweighted manually actuatable mechanisms adapted to unlatch said shuttle sections and open the same in an elevated position away from the article disposed in wrapping position.

In testimony whereof we have hereunto subscribed our names in the presence of two subscribing witnesses:

FRANK M. PIERCE.
WILLIAM BURGESS PIERCE.

Witnesses:
C. W. HILLS,
LAWRENCE REIBSTEIN.